United States Patent [19]
Gatehouse et al.

[11] Patent Number: 6,120,009
[45] Date of Patent: Sep. 19, 2000

[54] SHOCK STRUT WITH MANAGED DAMPING AND FORCE CHARACTERISTICS

[75] Inventors: Colin P. K. F. Gatehouse; Alan C. Kernik, both of Long Beach, Calif.

[73] Assignee: The Boeing Company, Seattle, Wash.

[21] Appl. No.: 09/061,695

[22] Filed: Apr. 16, 1998

[51] Int. Cl.[7] .................................................. F16F 5/00
[52] U.S. Cl. ................................................... 267/64.11
[58] Field of Search ........................... 267/64.11, 64.13, 267/64.18, 64.19, 64.23, 317, 266.1, 281, 312, 313, 314; 280/714, 707, 708, 709; 244/100, 102 R, 103, 104 FP; 188/297, 298, 289

[56] References Cited

U.S. PATENT DOCUMENTS

| | | |
|---|---|---|
| 2,690,887 | 10/1954 | Perdue . |
| 3,759,468 | 9/1973 | Boehringer et al. . |
| 3,826,450 | 7/1974 | Currey et al. . |
| 3,845,919 | 11/1974 | Jenny . |
| 4,082,255 | 4/1978 | Masclet et al. ........................ 267/64.28 |
| 4,328,939 | 5/1982 | Davies et al. . |
| 4,720,063 | 1/1988 | James et al. . |
| 4,730,816 | 3/1988 | Eckert .................................... 267/64.11 |
| 4,961,316 | 10/1990 | Corke et al. ...................... 267/64.11 X |
| 4,993,523 | 2/1991 | Schwemmer et al. ............... 188/266.5 |
| 5,219,152 | 6/1993 | Derrien et al. ........................ 267/64.15 |
| 5,276,622 | 1/1994 | Miller et al. ............................... 701/37 |
| 5,435,530 | 7/1995 | Sand ........................................ 267/114 |
| 5,460,340 | 10/1995 | White . |
| 5,588,641 | 12/1996 | Sand ........................................ 267/119 |
| 5,682,980 | 11/1997 | Reybrouck .............................. 280/714 |
| 5,988,606 | 11/1999 | Gatehouse ........................ 267/64.23 X |

*Primary Examiner*—Robert J. Oberleitner
*Assistant Examiner*—Melanie Talavera
*Attorney, Agent, or Firm*—Alston & Bird LLP

[57] ABSTRACT

A computer-controlled shock strut for a vehicle suspension system includes an infinitely adjustable damping valve connecting two internal fluid-filled chambers within the strut, such that compression and extension of the strut piston causes fluid to pass between the chambers through the damping valve. A microprocessor-based controller continuously and actively controls the position of the damping valve in response to input signals from various sensors associated with the strut, with the vehicle, and/or with the suspension system, so as to vary the damping rate of the strut to control piston position and motion. The strut also includes fluid supply and return valves which couple the two chambers to a pressurized fluid supply and a fluid return, respectively, to permit fluid to be added to or discharged from the strut. The supply and return valves are also controlled by the controller so that strut length can be controlled.

17 Claims, 10 Drawing Sheets

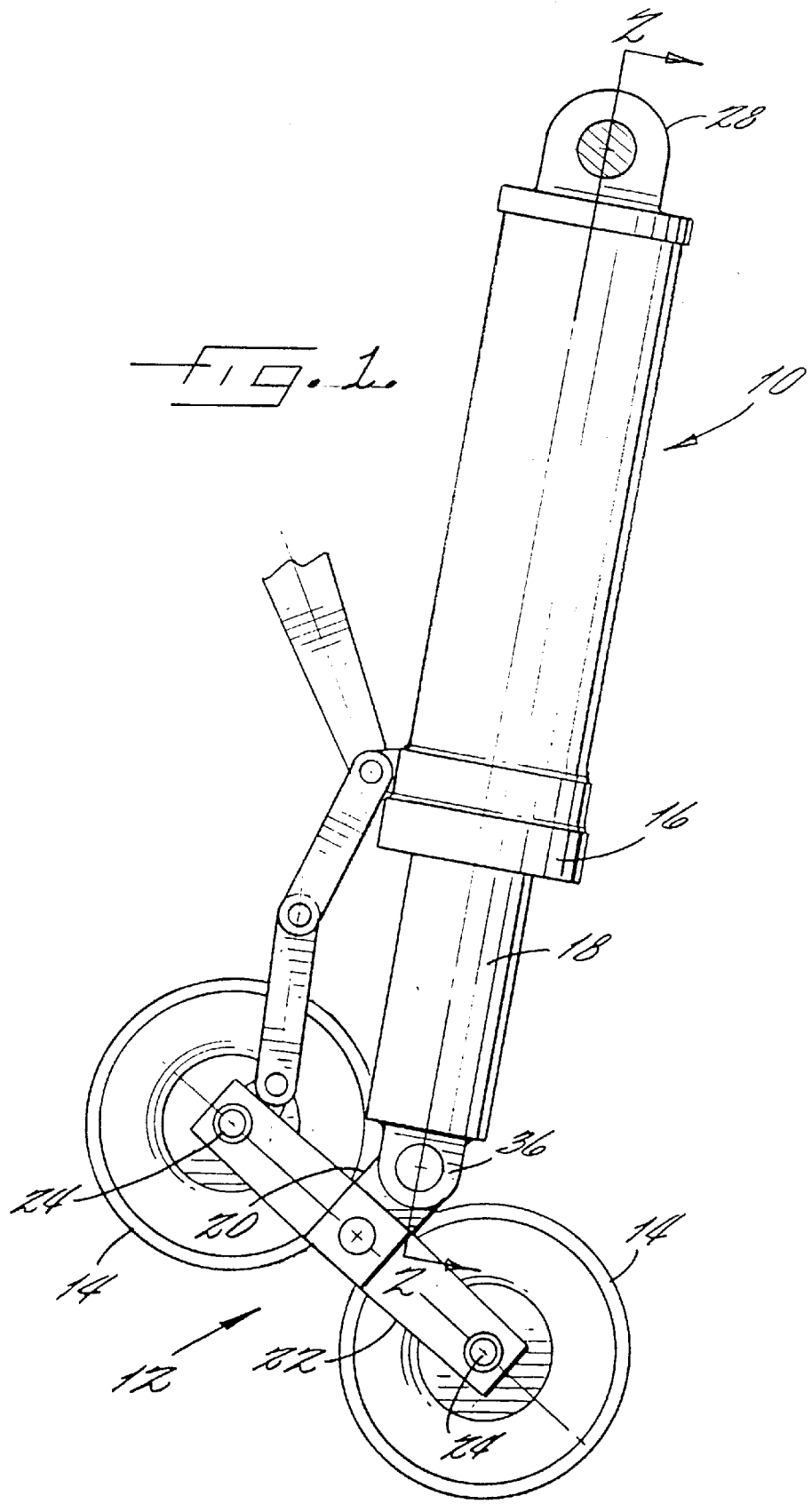

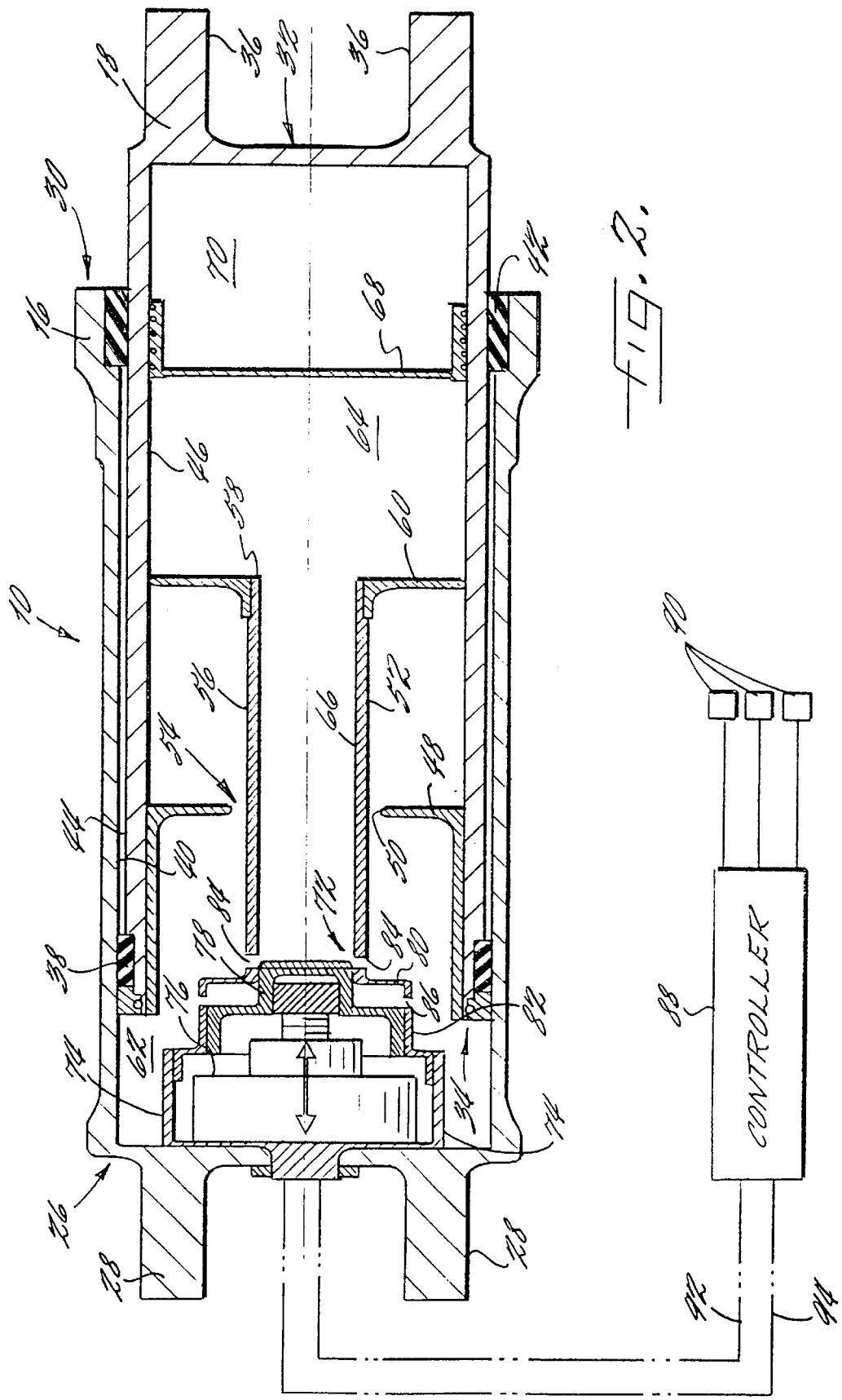

SHOCK STRUT WITH MANAGED DAMPING AND FORCE CHARACTERISTICS

FIELD OF THE INVENTION

The present invention relates to shock struts for damping and absorbing loads imposed on a vehicle suspension system and, more particularly, to a shock strut having active, continuous management of its damping and force characteristics.

BACKGROUND OF THE INVENTION

Shock-absorbing devices are used in a wide variety of vehicle suspension systems for controlling motion of the vehicle and its tires with respect to the ground and for reducing transmission of transient forces from the ground to the vehicle. A shock absorber accomplishes these functions by both dissipating and storing energy. Energy is stored within the shock absorber by compressing a liquid or a gas within a chamber, which acts as a spring, so that upon termination of a force compressing the shock absorber, the shock absorber is restored to its original uncompressed length. Energy is dissipated by passing a viscous liquid such as oil through an orifice, so that as the shock absorber is compressed or extended, its rate of motion is limited by the damping action of the orifice.

Shock struts which are used in the landing gear of aircraft are subject to more-demanding performance requirements than ground vehicle shock absorbers. Specifically, aircraft shock struts must be able to control motion of the landing gear and absorb and damp loads imposed on the gear during diverse use regimes including landing, taxi, and takeoff. Shock strut design must often be compromised between these diverse regimes, because strut damping and spring rates that are optimum for damping relatively small-amplitude motions experienced during taxi may not be optimum for controlling motion of the landing gear during landing, where significantly greater shock strut piston stroke and dynamic forces occur.

Consequently, shock strut damping may be less than ideal during landing, resulting in aircraft rebound caused by too-rapid spring extension of the shock strut after the initial touchdown and compression of the strut. Rebound is undesirable because aircraft braking efficiency is significantly reduced, leading to greater field length required to bring the aircraft to a stop. Moreover, subsequent ground loads after a rebound may be unnecessarily severe if the aircraft wing lift spoilers are deployed after initial touchdown.

In addition to the problem of rebound, other problems are associated with conventional shock struts for aircraft. For instance, during taxi, it is desirable for the shock strut to allow piston excursions caused by the tires encountering bumps or depressions in the runway, without transmitting significant forces to the aircraft and without the piston bottoming in the cylinder. However, with conventional shock struts, damping rate during taxi is often not optimum, with the result that passenger comfort may be compromised or, worse still, damage to the strut and/or the aircraft may occur should the piston bottom out.

Yet another consideration affecting strut design is the tail-down attitude of the aircraft during takeoff. One of the objectives of aircraft design is to locate the landing gear so that the aircraft fuselage is essentially horizontal during ground operations and has an appropriate sill height for ground servicing, and so that the aircraft can freely reach a tail-down attitude of the order of 15 degrees during takeoff. Further, strut length must be minimized to keep weight to a minimum and to facilitate the stowing of the gear during flight. While the ground operation requirements and weight considerations dictate a relatively shorter strut, in many cases aircraft takeoff performance could be enhanced by a longer strut permitting a greater tail-down angle. Accordingly, with conventional shock struts, the design must frequently be compromised by either accepting reduced takeoff performance with a too-short gear, or by accepting reduced flight performance with a too-long gear.

Shock struts having variable damping rate have been proposed as solutions to some of the problems noted above. For example, U.S. Pat. No. 4,061,295 issued to Somm discloses a shock absorber for an aircraft landing gear in which a solenoid-operated valve within the piston is activated to reduce the size of the damping orifice after a predetermined time has elapsed following initial compression of the piston at first touchdown on the runway. The reduced orifice size causes substantially increased damping. The increase of the damping rate is timed to coincide with the completion of a first reactive displacement cycle of spring compression and reextension, so that succeeding displacement cycles are sharply attenuated by the increased damping rate. The shock absorber thus has two damping rates, and the switch from one to the other is strictly a function of time. Furthermore, the design of the shock absorber does not address the damping and spring characteristics that are required during taxi, and does not address strut length considerations for takeoff.

U.S. Pat. No. 4,973,854 issued to Hummel discloses a hydraulic shock absorber having an internal electromagnetically operated damping valve through which all of the fluid passes during compression of the piston, the fluid passing between a working chamber defined between the piston and the cylinder and a compensating chamber disposed within the piston. The electromagnet is controlled by an electronic control in response to measurements such as vehicle traveling speed, speed of compression, loading conditions, etc. The shock absorber can also be adjusted in length by pumping additional fluid into it or discharging fluid from it. The damping valve is actuated by fluid pressure, the electromagnet influencing only the closing force of the damping valve counteracting the fluid pressure. Thus, in the event of a power failure, the damping rate of the shock absorber would vary according to the fluid pressure, with high compressive forces being damped less and low compressive forces being damped more, which may be undesirable.

SUMMARY OF THE INVENTION

The invention overcomes the drawbacks associated with conventional shock struts noted above, by providing a shock strut and control system in which damping, length, and spring characteristics of the strut are continuously and actively managed by the control system to achieve predetermined desired characteristics in response to sensory input received by the controller. Accordingly, the shock strut can be controlled to have a lower damping rate during the early part of a piston stroke on initial touchdown at landing, and a higher damping rate during the later part of the stroke. This, in effect, allows a longer piston stroke and generates lower loads in landings at less than maximum energy. If a tendency to rebound occurs, resistive damping during piston reextension takes place over a longer stroke, and rebound is thereby diminished. During taxi, transient loads caused by dips or bumps are controlled by sensing sudden piston extension or compression and responsively reducing the damping rate to permit the piston to extend or retract without transmitting substantial force to the aircraft. During takeoff, the strut length can be increased to permit a greater tail-down attitude so as to enhance takeoff performance.

According to a first aspect of the invention, a shock absorber system includes a fluid-filled shock absorber having an actuatable damping valve through which all or part of the fluid passes during a damping mode of the strut. The damping valve is infinitely adjustable between a fully open position and a fully closed position. A microprocessor-based controller selectively actuates the damping valve in response to sensory input received by the controller, so as to control the damping and force characteristics of the shock absorber. The shock absorber comprises a hollow cylinder having a closed end and an open end and a piston received within the open end. The piston includes a ram which is slidable within the cylinder and which divides the fluid-filled space within the shock absorber into first and second chambers. A fluid passage connects the first and second chambers, and the damping valve is disposed such that the fluid passing between the chambers passes through the damping valve. The damping valve may be located either inside or outside the shock absorber. Opening the valve reduces the damping rate of the shock absorber, and closing the valve increases the damping rate. The controller continuously and actively controls the valve in accordance with an appropriate control scheme, based on input signals received from sensors associated with the shock absorber and sensors associated with the vehicle.

In accordance with a further aspect of the invention, the shock absorber system further includes actuatable supply and return valves through which fluid is supplied to the strut and/or discharged from the strut, respectively, when the valves are open. A supply of pressurized fluid is connected to one of the chambers through the supply valve which is actuatable to open and close, and the other chamber is connected to a fluid return through the return valve which is actuatable to open and close. By opening the supply valve, the piston is made to extend or retract depending on which chamber is connected to the supply. For a powered strut in which only powered extension is desired, the fluid supply is connected to the chamber in which fluid pressure acts on the ram to cause extension of the piston. When the supply and return valves are closed, a compressive load applied to the piston causes movement of fluid from one chamber to the other through the damping valve. By controlling the orifice size of the damping valve, damping of the shock absorber is controlled. With appropriate design of the chambers, the shock absorber can also behave as a liquid spring.

In accordance with an additional aspect of the invention, the strut includes a gas spring within an internal cavity of the piston for providing a relatively "soft" spring action of the strut.

When the shock absorber system of the invention is used in an aircraft landing gear, the control system sensors may measure strut parameters such as piston position, velocity and acceleration, oil pressure, oil volume, and oil temperature; aircraft parameters such as linear and angular velocity, linear and angular acceleration, distance from the runway, and positions of various control surfaces of the aircraft; and landing gear parameters such as wheel angular velocity and acceleration, brake torque, and bogie beam angular position, velocity, and acceleration. Other sensory inputs may also be used.

The invention thus provides a shock absorber system in which complete control over the damping, length, and spring characteristics of the shock absorber are actively and continuously managed by a controller. When used as part of an aircraft landing gear, the invention permits the shock strut to provide optimum damping over a diverse range of operating conditions.

The aforementioned and other objects and advantages of the invention will become more apparent from the following detailed description of particular embodiments of the invention taken in conjunction with the accompanying drawings.

BRIEF DESCRIPTION OF THE DRAWINGS

FIG. 1 is a side elevational view of an aircraft landing gear including a shock strut.

FIG. 2 is a cross-sectional view taken on line 2—2 through the shock strut of FIG. 1, showing a first embodiment of a shock strut in accordance with the present invention, in which the damping valve is internal.

DETAILED DESCRIPTION OF THE DRAWINGS

Figure 2A:
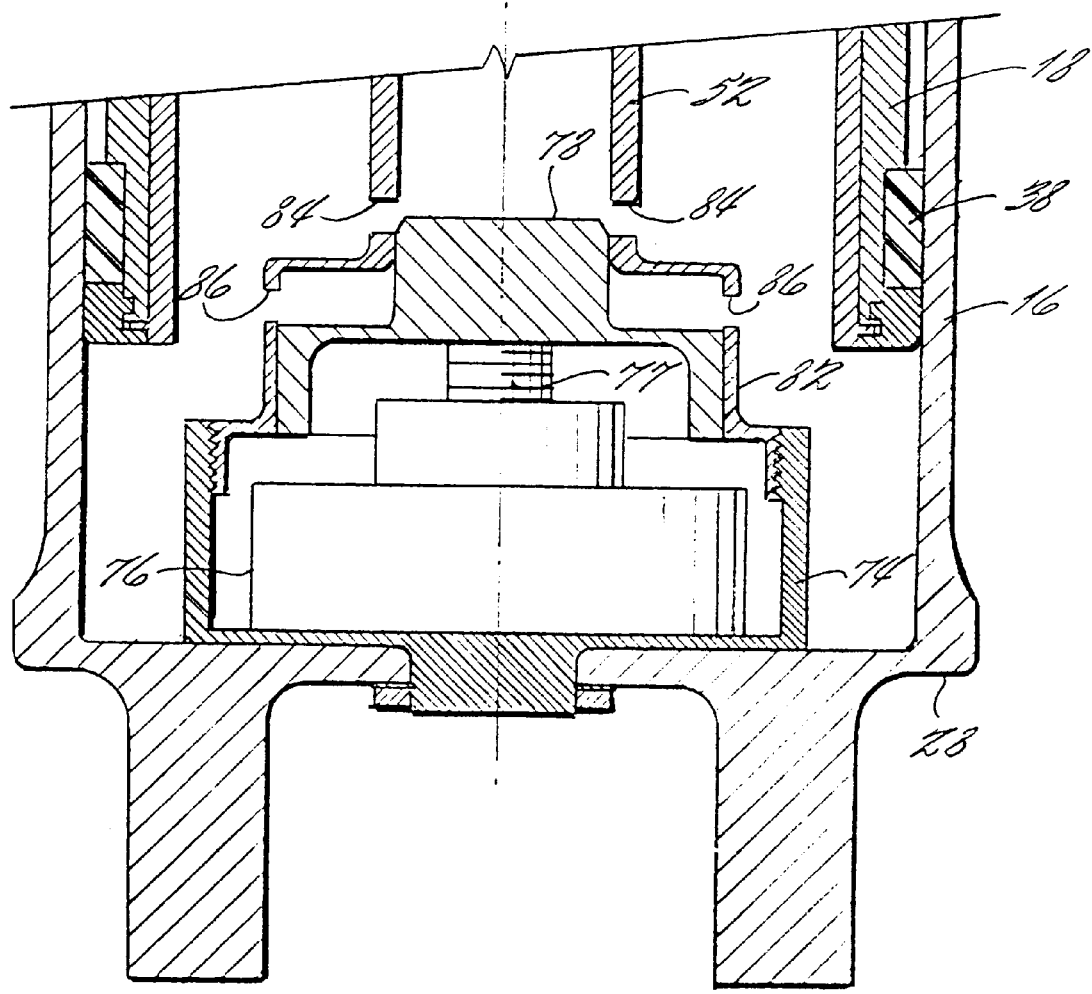
FIG. 2A is an enlarged cross-sectional view similar to FIG. 2, showing the bypass valve and motor in greater detail.

Reference is now made to the drawings which depict illustrative embodiments of the invention. These embodiments are described in order to explain the general principles of the invention, and are not intended in any way to limit the scope of the invention. Throughout the drawings, like parts are denoted by the same reference numerals.

With reference to FIG. 1, a shock strut 10 is shown as part of an aircraft landing gear which includes a truck 12 having a set of wheels 14. The shock strut 10 includes a cylinder 16 and a piston 18 which telescopes into and out of the cylinder 16. The truck 12 is affixed to the lower end of the piston 18 via a link 20 which in turn is connected to the bogie beam 22 of the truck 12. The invention is described herein in connection with a main landing gear of a well-known type for an aircraft as shown in FIG. 1, in which each end of the bogie beam 22 supports an axle 24 on which a pair of wheels 14 are mounted, the truck 12 thus supporting four wheels 14.

However, the invention is applicable to various types of landing gear, and more generally to any type of vehicle suspension system.

With reference to FIG. 2, the internal configuration of the shock strut 10 is shown. The cylinder 16 has a closed end 26 which has external integral mounting lugs 28, and an open end 30 which receives the piston 18. The piston 18 has a closed end 32 which is outside the cylinder 16 and an open end 34 which telescopes into the cylinder 16. The closed end 32 also includes external integral mounting lugs 36. The piston 18 includes a seal 38 adjacent its open end 34 which makes sealing contact with the inner surface 40 of the cylinder 16, and the cylinder 16 includes a seal 42 adjacent its open end 30 which makes sealing contact with the outer surface 44 of the piston 18. The seals 38 and 42 provide fluid-tight sealing of the internal space within the shock strut 10.

The internal space within the strut is bounded by the closed end 32 of the piston and the inner surface 46 of the piston, and the closed end 26 of the cylinder and the inner surface 40 of the cylinder. The space is further divided into two chambers, as further described below, by a ram or orifice plate 48 which is supported by the inner surface 46 of the piston 18. The orifice plate 48 has a central hole 50 through it. Extending through the hole 50 is a separator tube 52 supported by the cylinder 16. An annular orifice 54 exists between the inner edge of the hole 50 and the outer surface 56 of the separator tube 52. The free end 58 of the separator tube 52 has a stabilizing ring 60 which makes sliding contact with the inner surface 46 of the piston 18 to help keep the separator tube 52 concentric with the piston 18 and orifice plate 48. The stabilizing ring 60 includes openings (not shown) through it to allow fluid to move across it.

The strut is thus internally divided into a first chamber 62 and a second chamber 64. The first chamber 62 is bounded by the closed end 26 and inner wall 40 of the cylinder, the seal 38, the inner surface 46 of the piston, the outer surface 56 of the separator tube 52, and the side of the orifice plate 48 facing the closed end 26. The second chamber 64 is bounded by the other side of the orifice plate 48, the inner surface 46 of the piston, the inner surface 66 of the separator tube, and a movable diaphragm 68 mounted within the piston 18 adjacent its closed end 32. Both chambers are filled with a viscous fluid such as oil. Thus, when the piston 18 is compressed into the cylinder 16 (to the left in FIG. 2), fluid flows from the first chamber 62 into the second chamber 64 via the orifice 54. The orifice 54 thus provides damping of the piston motion.

The strut also includes a gas chamber 70 defined by the movable diaphragm 68, the inner surface 46 of the piston, and the closed end 32 of the piston. The gas chamber 70 is filled with a gas. Upon compression of the piston 18, oil pressure within the second chamber 64 increases above the gas pressure in the gas chamber 70, which causes movement of the diaphragm 68 toward the closed end 32 until the pressure in gas chamber 70 equals the oil pressure in second chamber 64. When the force compressing the strut is removed, the gas pressure in gas chamber 70 exceeds the oil pressure in second chamber 64, and hence the diaphragm 68 moves away from the closed end 32 until the pressure across the diaphragm 68 is equalized or until the diaphragm abuts a mechanical stop (not shown). The movement of the diaphragm 68 causes oil to flow in a reverse direction through orifice 54 into the first chamber 62, which causes the piston 18 to be extended back out of the cylinder 16 to its original position.

The strut 10 also includes a damping valve 72 which defines a second fluid path between the first chamber 62 and the second chamber 64, and which is remotely actuatable by a control system, as described below, to selectively vary the rate of fluid flow through the valve during piston excursions. The damping valve 72 includes a housing 74 which is affixed to the closed end 26 of the cylinder. A motor 76 is contained with the housing 74. The motor 76 is adapted to move a valve member 78 toward or away from the closed end 26 of the cylinder. The valve member 78 cooperates with the separator tube 52 to open and close the damping valve 72.

Specifically, the valve member 78 is sized to fit closely within the inner surface 66 of the separator tube 52. The separator tube 52 includes an enlarged end portion 80 which is threaded into the housing 74. The enlarged end portion 80 includes a cylindrical section 82 in which the valve member 78 slides. A plurality of bypass orifices 84 extend through the separator tube 52 adjacent the enlarged end 80. The valve member 78 has a range of motion permitting it to be extended by the motor 76 so as to cover the bypass orifices 84, and to be retracted by the motor 76 so as to uncover the bypass orifices 84. The cylindrical portion 82 of enlarged portion 80 includes balancing orifices 86 which permit fluid to move between the chamber 62 and the interior of the cylindrical portion 82 so that the valve member 78 may be freely moved within the cylindrical portion 82.

The motor 76 is capable of precisely controlling the position of the valve member 78 anywhere between the fully open and fully closed positions, so that the damping valve 72 is infinitely adjustable between those extremes. Any type of motor suitable for this purpose may be used. Preferably, the motor 76 is a servomotor. FIG. 2A depicts one possible arrangement of the motor 76 and valve member 78 permitting such precise and infinitely variable control of the position of valve member 78. The motor 76 includes an output shaft 77 that is helically threaded. The valve member 78 has an internally threaded hole (not shown) which engages the threaded shaft 77. The valve member 78 is constrained not to rotate when the shaft 77 is rotated by the motor 76. Thus, rotation of shaft 77 in one direction or the other causes valve member 78 to be extended or retracted to further close or further open the bypass orifices 84. Precise control of the rotational position of the motor 76 thus enables precise control of the position of valve member 78.

The bypass orifices 84 define the second fluid path between the first chamber 62 and the second chamber 64. When the damping valve 72 is open, fluid passes between the first and second chambers 62 and 64 via both the primary orifice 54 as well as the bypass orifices 84, and accordingly the damping rate of the strut is relatively low. When the damping valve is closed, fluid passes between chambers only via the primary orifice 54, so that the damping rate is relatively high. The sizes of the primary orifice 54 and bypass orifices 84 may be selected to achieve any desired range of damping for the strut 10. Additionally, it will be appreciated that the arrangement of damping valve 72 depicted in FIGS. 2 and 2A is only one possible configuration for the valve, and various other types of valves may be substituted therefor. For instance, the valve 72 may alternatively be a needle valve. Moreover, while valve 72 is depicted as being internal, the valve may alternatively be external to the strut.

The damping valve 72 is controlled by a controller 88 which includes a microprocessor. The controller 88 receives input signals from a plurality of sensors 90, which may be associated with the strut 10, with the aircraft or other vehicle in which the strut 10 is installed, with the landing gear or other suspension system of which the strut 10 forms a part, etc. The motor 76 preferably is a servomotor, and the controller 88 also receives a signal from the motor 76 via a feedback line 92, indicating the position of the motor 76 with respect to a known reference position. The controller 88 is programmed with control logic embodying an appropriate control scheme for controlling the motor 76 in accordance with a desired performance characteristic for the strut 10. The controller 88 receives the inputs from sensors 90 and the motor 76, determines a desired position of the motor 76 and valve member 78 based on those inputs, and sends a control signal to the motor 76 via control line 94 in order to move the motor 76 and valve member 78 toward the desired position. The controller repeats the process periodically according to a desired frequency.

Figure 3:
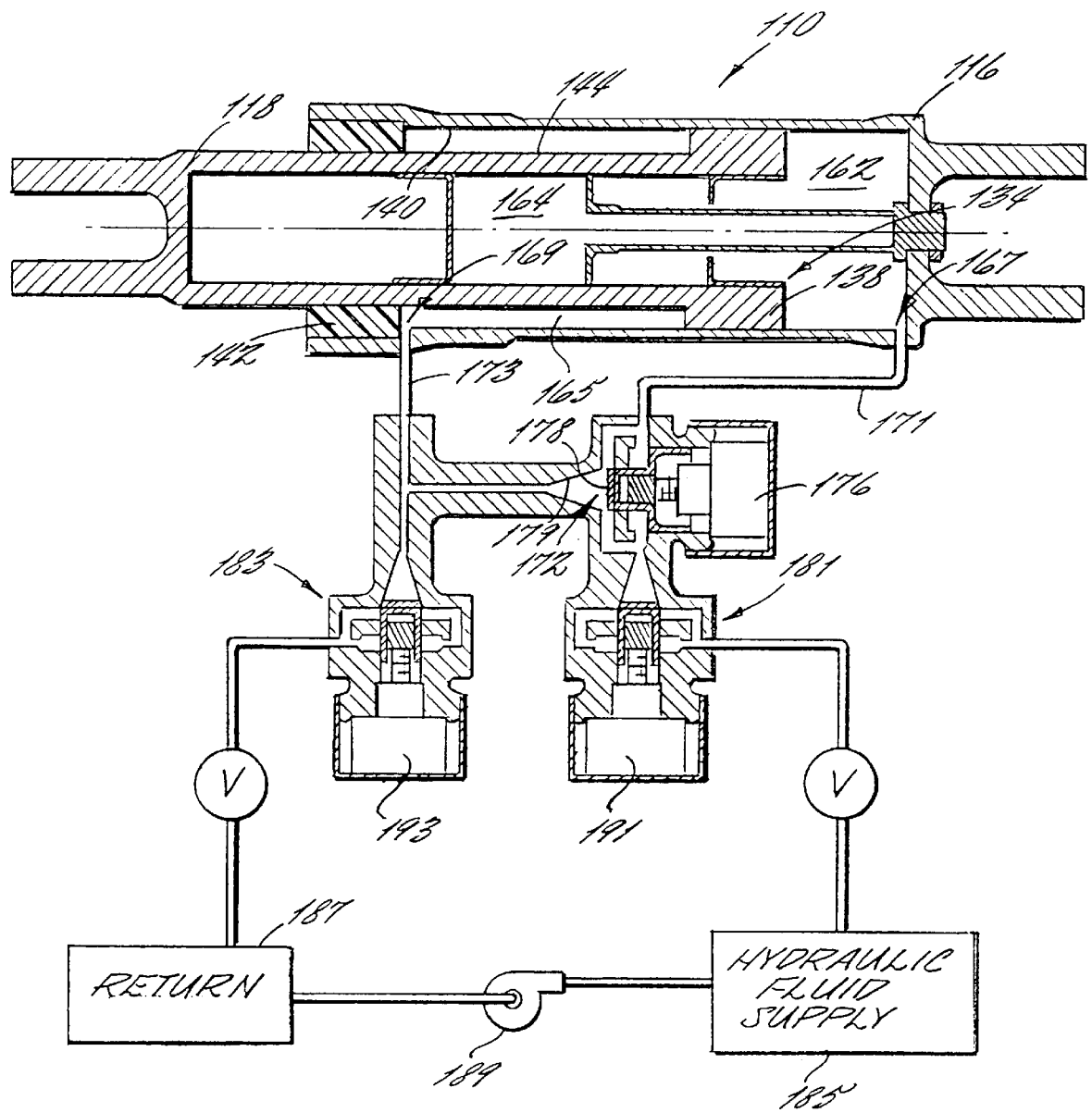
FIG. 3 is a cross-sectional view of a second embodiment of a shock strut in accordance with the invention, in which the damping valve is external, and also schematically showing supply and return valves coupled to a fluid supply and a fluid return.

The strut 10 depicted in FIG. 2 has damping and spring capabilities. FIG. 3 depicts another preferred embodiment of the invention in which the capability of controllably extending the strut has been added. The strut 110 of FIG. 3 also has an external damping valve, as opposed to the internal valve of the strut 10. The strut 110 is similar in internal construction to the strut 10, with the primary exception being that in addition to the first chamber 162 and second chamber 164, a third chamber 165 exists between the outer surface 144 of the piston 118 and the inner surface 140 of the cylinder 116. The open end 134 of the piston 118 includes a seal or ram 138 which extends radially outward from the outer surface 144 of the piston and makes sealing contact with the inner surface 140 of cylinder 116. The seal 142 at the open end of the cylinder 116 makes sealing contact with the outer surface 144 of the piston 118. The third chamber 165 is thus bounded by the ram 138 and the seal 142.

A pair of ports 167 and 169 extend through the cylinder 116 into the first chamber 162 and third chamber 165, respectively. A line 171 couples the port 167 to one side of a damping valve 172, and a line 173 couples the port 169 to the other side of the damping valve 172. Thus, upon compression of the piston 118 into the cylinder 116, fluid flows from first chamber 162 through the port 167 and line 171, through damping valve 172, through line 173 and port 169 into third chamber 165. Fluid follows a reverse course upon extension of the piston 118. The fluid passage through line 171 and line 173 thus comprises a fluid bypass passage for fluid to flow between the chambers 162 and 165.

The damping valve 172 is actuated to open and close by a motor 176, preferably a servomotor, which moves a valve member 178 in relation to a valve seat 179. The motor 176 is controlled by a controller (not shown in FIG. 3) to achieve a desired damping rate for the strut in the same manner described above in connection with FIG. 2.

The shock strut system of FIG. 3 also includes supply and return valves 181 and 183, respectively, for controlling extension and retraction of the piston 118. The supply valve 181 is connected between a supply 185 of pressurized fluid and the first chamber 162. In FIG. 3, the supply valve 181 is illustrated as being in parallel with the damping valve 172 so that fluid can flow from the supply 185 to the first chamber 162, via line 171 which form part of the bypass passage, when the damping valve 172 is closed, for reasons which will become apparent. However, it will be appreciated that the supply valve 181 may alternatively be in series with the damping valve 172 with appropriate modifications to the remaining fluid circuitry. For example, the supply valve 181 could be of a simple solenoid type construction controllable to be either open or closed but not adjustable between those modes, and the fluid could be constrained by appropriate design of the fluid circuitry to always pass through the damping valve 172 so that the supply fluid is metered by the damping valve 172, thus achieving infinitely variable control of the supply flow to the strut even with a simple solenoid type supply valve 181. It will also be appreciated that the arrangement of supply and return depicted in FIG. 3 could be used in connection with the strut embodiment shown in FIG. 2.

The return valve 183 is connected between a fluid return 187 and the third chamber 165 via the line 173. The fluid return 187 may optionally be connected to the fluid supply 185 via a pump 189 to form a closed-loop fluid system. The return valve 183 is illustrated as being in parallel with the damping valve 172. However, various types and arrangements of the damping valve 172, supply valve 181, and return valve 183 are possible.

Figure 4:
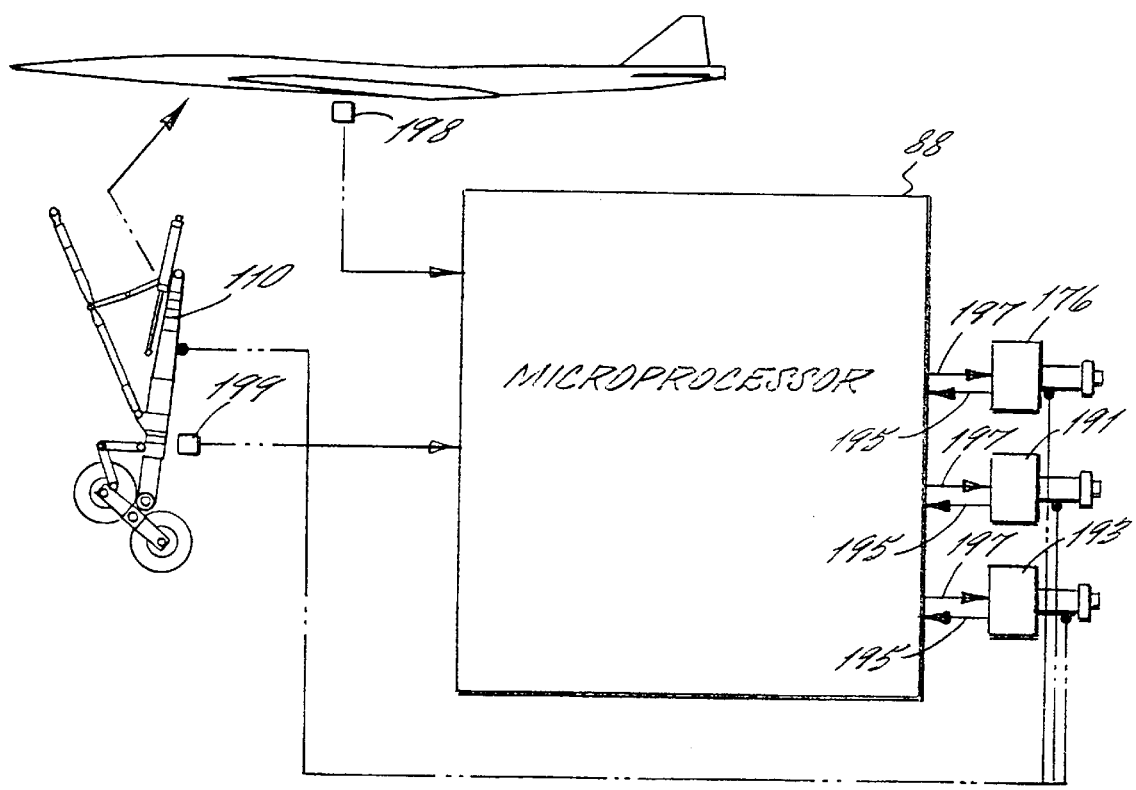
FIG. 4 is a diagrammatic representation of a control system for a shock absorber in accordance with the invention, showing the controller receiving representative inputs from the aircraft and the landing gear and supplying control outputs to the damping, supply, and return valves of the shock strut.

The supply and return valves 181 and 183 are actuated to open and close by motors 191 and 193, respectively. With reference to FIG. 4, the motors 176, 191, and 193 are connected to the controller 88, which receives feedback signals from the motors as indicated by arrows 195 and sends control signals to the motors as indicated by arrows 197 in order to operate the valves 172, 181, and 183 in a desired manner as determined by the controller 88 based on its control logic and the sensory inputs received by the controller 88. FIG. 4 schematically depicts the controller 88 receiving input signals from sensors 198 associated with an aircraft and from sensors 199 associated with the strut 110 and landing gear.

The controller 88 independently controls the damping valve 172, supply valve 181, and return valve 183 to achieve desired damping, force, and length characteristics of the strut 110. For instance, when the supply and return valves are closed and the damping valve is open as shown in FIG. 3, fluid passing between the chambers 162 and 165 is constrained to pass through the damping valve 172, which is controlled to achieve a desired damping rate. When the damping valve 172 is closed and the supply valve 181 and return valve 183 are open, pressurized fluid is supplied to the first chamber 162, which causes extension of the piston 118 and discharge of fluid from third chamber 165 to the fluid return 187.

It will therefore be appreciated that the controller 88 may be programmed to control the strut 110 to achieve any desired piston displacement, velocity, and acceleration by appropriate control of the valves. Thus, optimum strut damping, force, and length may be achieved throughout the diverse use regimes encountered in an aircraft landing gear.

Figure 5:
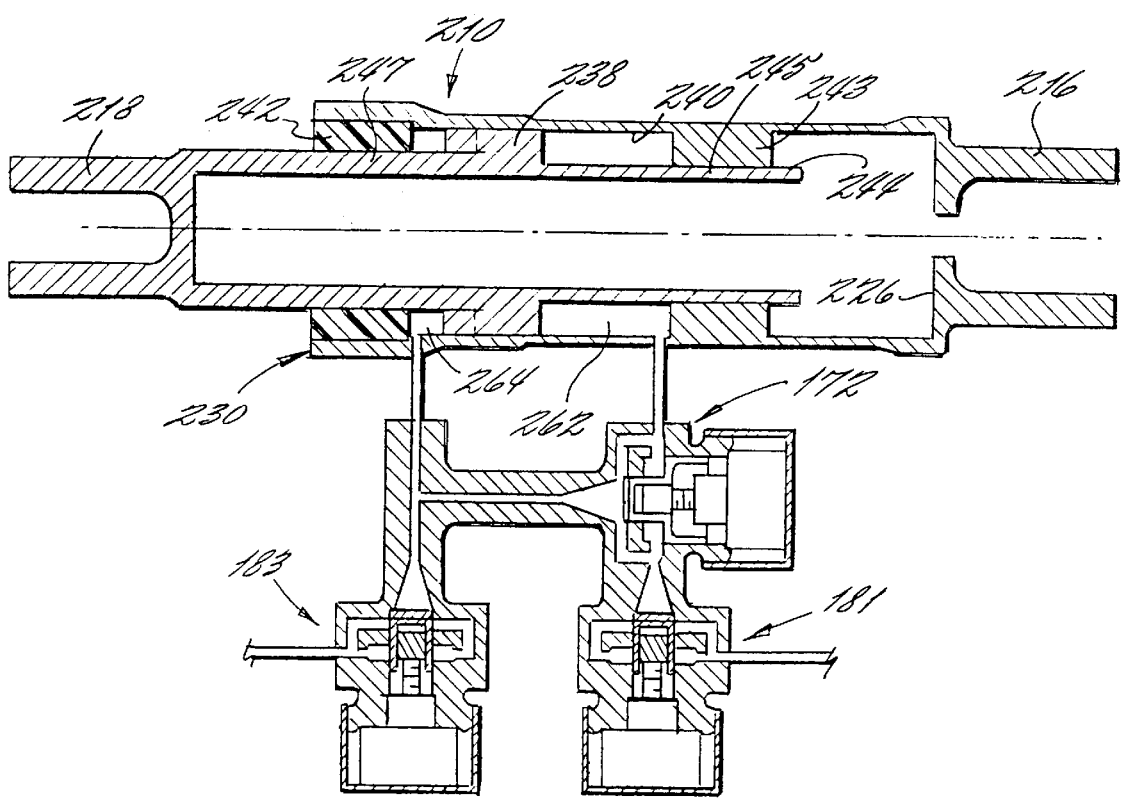
FIG. 5 is a cross-sectional view of a third embodiment of a shock strut in accordance with the invention.

FIG. 5 illustrates yet another embodiment of a strut in accordance with the invention, in which the gas spring has been omitted and the strut internal configuration has been adapted to provide liquid spring action. The strut 210 includes a cylinder 216 which has a pair of spaced-apart seals 242 and 243 which extend radially inward from the inner surface 240 of cylinder 216 and make sealing contact with the outer surface 244 of the piston 218. Seal 243 is located between the open end 230 and the closed end 226 of cylinder 216 and seals against a first smaller-diameter portion 245 of piston 218. Seal 242 is adjacent the open end 230 of the cylinder 216 and seals against a second larger-diameter portion 247 of piston 218. A piston seal or ram 238 is located on the piston 218 between the two cylinder seals 242 and 243 at the transition between the first portion 245 and the second portion 247. The ram 238 makes sealing contact with the inner surface 240 of cylinder 216. Thus, a first fluid chamber 262 is bounded between the first smaller-diameter portion 245 and the cylinder 216 and between the ram 238 and the seal 242, and a second fluid chamber 264 is bounded between the second larger-diameter portion 247 and the cylinder 216 and between the ram 238 and the seal 243.

Because the cross-sectional area of the first chamber 262 is larger than that of the second chamber 264, compression of the piston 218 into the cylinder 216 causes a net decrease in the combined fluid volumes of the two chambers. Accordingly, when the supply and return valves 181 and 183 are closed, the fluid within the strut 210 is compressed and thereby stores energy within the strut. The motion of the piston 218 is also damped as fluid flows through the damping valve 172 between the chambers 262 and 264. As with the strut 110, the strut 210 can also function as an actuator when the damping valve 172 is closed and the supply and return valves 181 and 183 are opened.

Figure 6A:
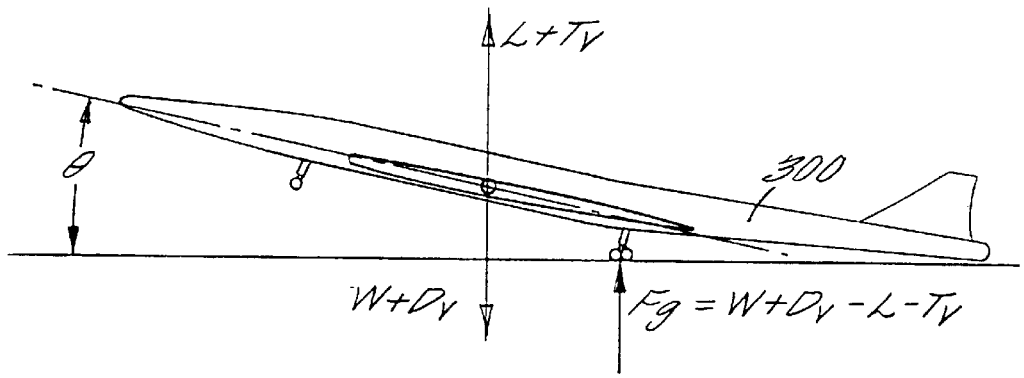
FIG. 6A is a diagrammatic view of an aircraft during a takeoff roll, illustrating the strut force applied to the landing gear shock strut.
Figure 6B:
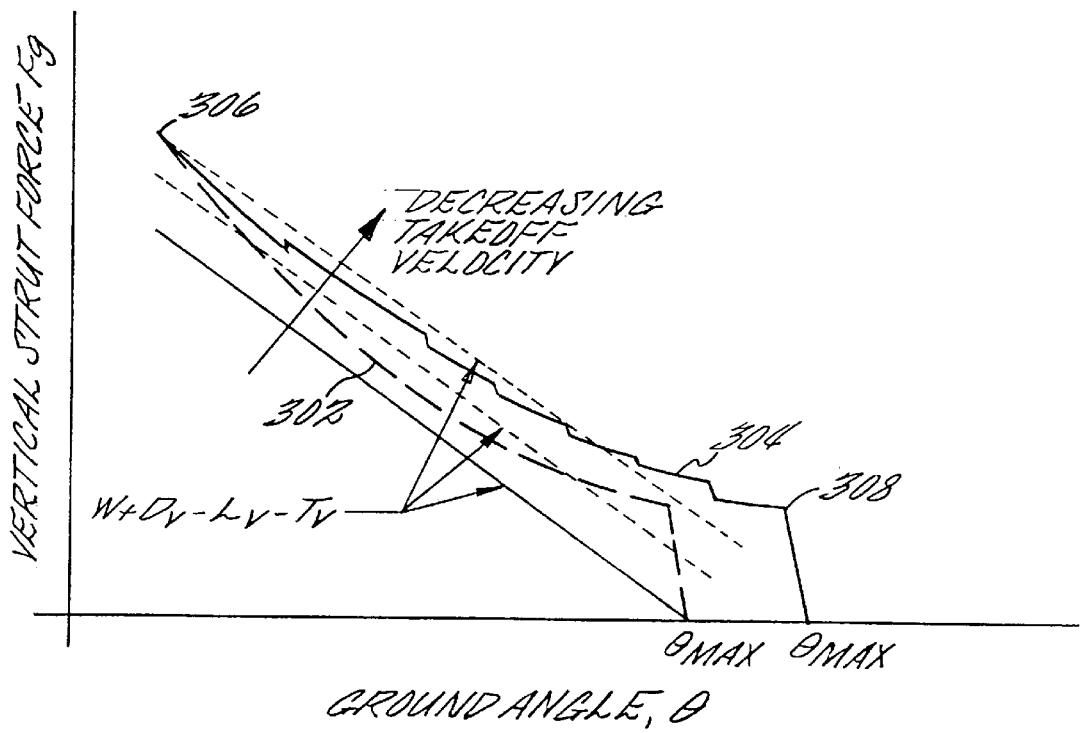
FIG. 6B is a schematic representation of strut force versus aircraft ground angle both with a conventional strut and with a strut in accordance with the invention.

FIGS. 6A and 6B illustrate one of the significant advantages afforded by a shock strut in accordance with the present invention when used in an aircraft main landing gear. One of the objectives of aircraft design is to locate the main landing gear so that the aircraft fuselage is essentially horizontal and has an appropriate sill height during ground operations, and so that the aircraft can freely reach a tail-down attitude of the order of 15 degrees during landing and takeoff. In many cases, aircraft takeoff performance, as measured by takeoff distance or velocity, could be enhanced if the aircraft were capable of reaching a greater tail-down attitude. FIG. 6A schematically depicts an aircraft 300 during a takeoff. The aircraft is pitched up at an angle represented by $\theta$. The vertical force exerted on the main landing gear, and hence on the shock strut, is the sum of the lift L, the vertical component of thrust $T_v$, minus the aircraft weight W, minus the vertical component of drag $D_v$. This vertical force is represented by $F_g$. As illustrated by the downward-sloping straight lines on the graph of FIG. 6B, the strut force $F_g$ is a function of aircraft velocity, decreasing with increasing velocity at any given angle $\theta$. Conversely, at a given strut force $F_g$, a greater angle $\theta$ permits a lower takeoff velocity. It will be appreciated that the maximum achievable aircraft tail-down attitude $\theta$ is a function of the length of the landing gear. Thus, a longer shock strut affords the potential for enhanced takeoff performance.

With a conventional shock strut, however, the strut length is a function solely of the load applied to the strut. As the aircraft rolls down the runway during takeoff, the velocity increases, which decreases the strut force $F_g$, causing the strut to gradually unload and the piston to extend. The increasing strut length permits a greater tail-down angle $\theta$. This is illustrated by the curve 302 in FIG. 6B. The strut continues to extend until it reaches full extension, represented by the break-point in the curve. The tires then unload, as represented by the near-vertical portion of curve 302. The maximum ground angle $\theta_{max}$ occurs when the strut and tires are fully unloaded as the strut force $F_g$ goes to zero.

Thus, with a conventional shock strut, the maximum ground angle can be increased only by making the strut longer over all operating regimes, since piston position is linked to the strut force. In contrast, with a shock strut in accordance with the present invention, such as the struts 110 and 210 shown in FIGS. 3 and 5, piston position is decoupled from the strut force because the fluid volume within the strut is variable. Accordingly, for a given strut force $F_g$, the strut length can be varied, and in particular can be increased when it is advantageous to do so, such as during takeoff. The curve 304 illustrates the performance advantage afforded by this capability. The shock strut of the invention begins with the same length as the conventional strut, as indicated at 306 by the fact that the ground angle is the same for both struts. However, as the aircraft rolls down the runway and gains speed so as to begin to unload the strut, the control system operates the supply and return valves to add fluid to the strut so as to increase the strut length at a faster rate than for the conventional strut. The break points in the curve 304 schematically represent the control of the strut by the control system which periodically adjusts the strut length. The full extension of the strut is indicated at 308, where the strut has a length greater than that of the conventional strut. Consequently, the aircraft can reach a greater maximum tail-down attitude.

Figure 7:
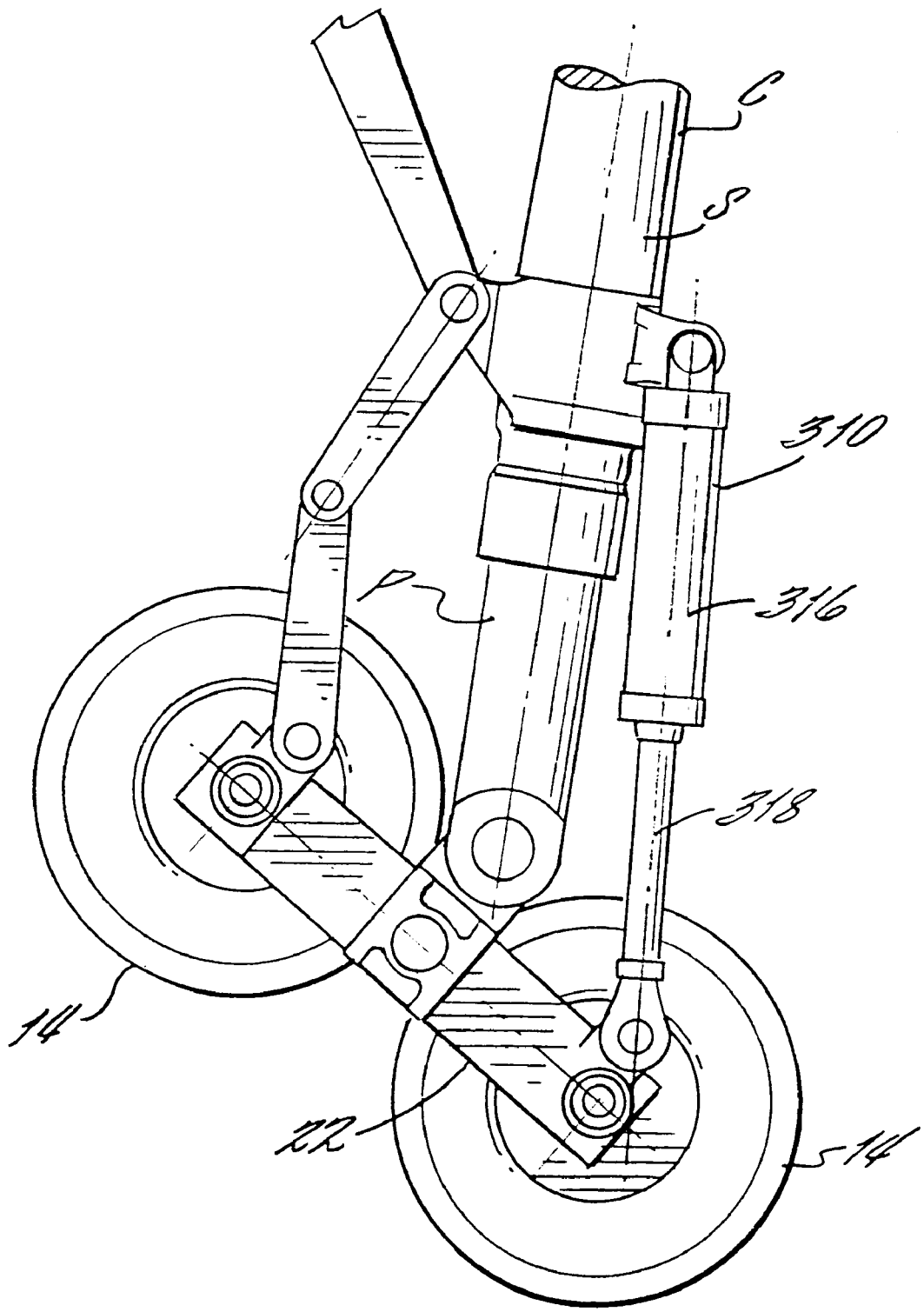
FIG. 7 is a side elevational view of an aircraft landing gear having a shock strut in accordance with the invention as an adjunct to the main shock strut.

Although FIG. 1 and the description thus far have illustrated the strut provided by the invention as being the main landing gear shock strut itself, it will be appreciated that similar strut-lengthening and variable damping advantages may be achieved with the strut as an adjunct to the main shock strut. FIG. 7 depicts an aircraft landing gear having a main shock strut S of a conventional type, and a managed damping and variable-length shock strut 310 in accordance with the invention connected in parallel between the cylinder C of the strut S and the bogie beam 22 which carries the wheels 14. The piston P of the main strut S is pivotally attached to the center of the bogie beam 22, and the piston 318 of the managed strut 310 is pivotally attached to the aft end of the bogie beam 22. The cylinder 316 of the strut 310 is pivotally attached to the cylinder C of the main strut S. Thus, for a given angular orientation of the bogie beam 22, damping of the strut 310 helps resist compression and extension of the main piston P. Further, for a given position of piston P, changing the length of the strut 310 causes the angular orientation of the bogie beam 22 to be changed.

Accordingly, it will be appreciated that the effective length of the landing gear may be managed by managing the length of the strut 310. Specifically, during takeoff, the strut 310 may be actuated to rotate the bogie beam 22 into a position as shown in FIG. 7 such that the leading set of wheels are raised and only the trailing set of wheels are in contact with the runway. When so rotated, the bogie beam 22 effectively extends the length of the landing gear so that the aircraft can attain a greater tail-down attitude.

During landing and taxi, the strut 310 is managed to damp oscillatory motion of the bogie beam 22. Moreover, any rebound tendency of the main strut S is damped by the resistive damping of the strut 310, since extension of the main piston P causes extension of the strut 310. Although the strut 310 is shown attached to the aft end of the bogie beam 22, it may alternatively be attached to the forward end of the beam 22, and in either location the strut 310 may be connected the the strut S and beam 22 indirectly via additional linkages. The aft position of the strut 310 is preferred, since in that configuration the reactive forces of the main strut S and the adjunct strut 310 are additive.

Figure 8:
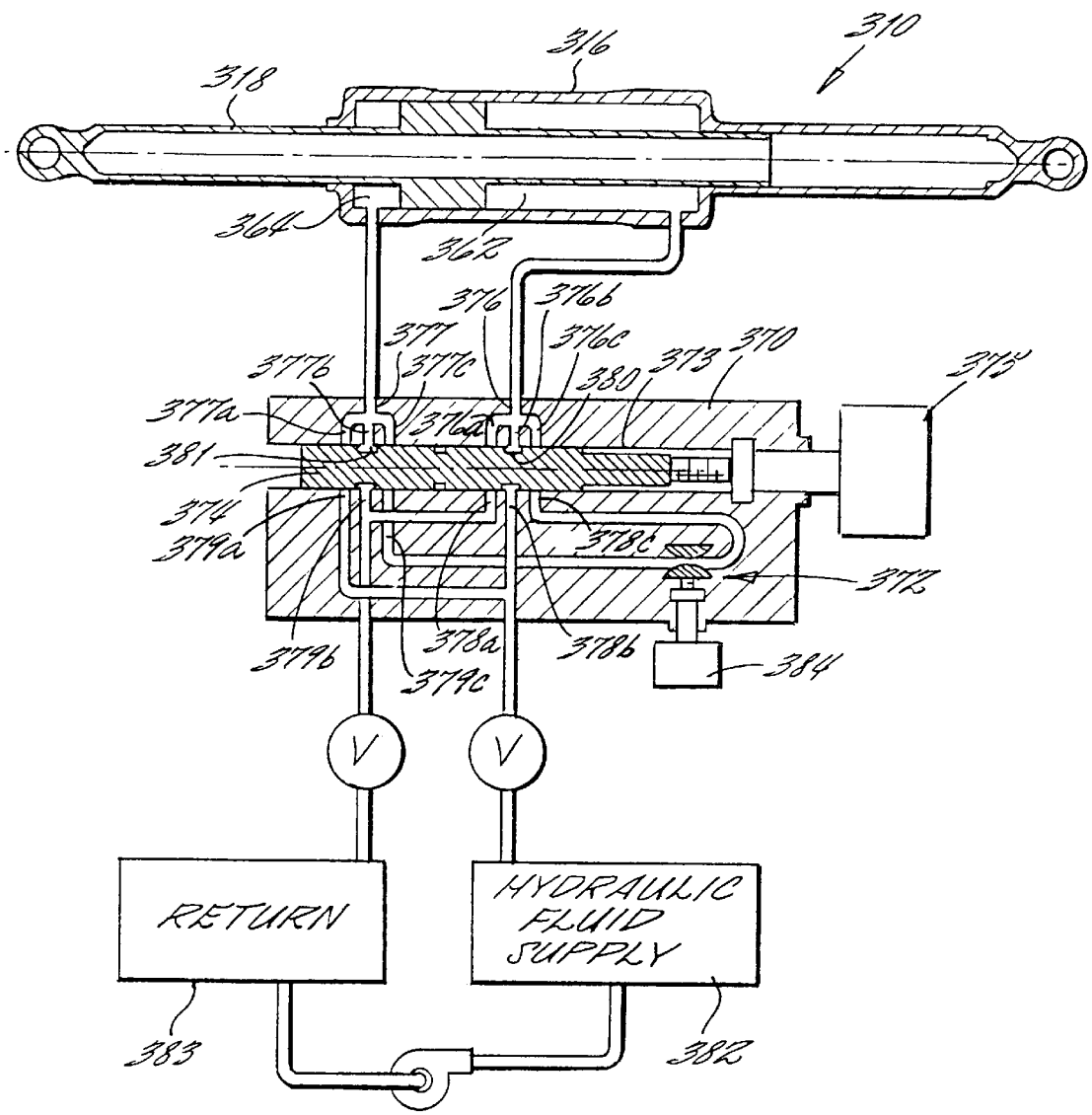
FIG. 8 is a cross-sectional view of the shock strut of FIG. 7 and including a schematic representation of a valving arrangement for the strut.

FIG. 8 shows the strut 310 with controllable external valving for managing the damping and length characteristics of the strut 310 in a manner similar to that described above in connection with FIGS. 3 and 5. Fluid chambers 362 and 364 are connected to an external valve block 370 containing an actuatable damping valve 372. The valve block 370 has a bore 373 within which a valve pin 374 slides, and movement of the valve pin 374 within the bore 373 is controlled by a valve power unit 375. The chamber 362 of strut 310 is connected to a passage 376 in valve block 370, and chamber 364 is connected to a passage 377 in valve block 370. Passage 376 branches into three passages 376a, 376b, and 376c which connect with the bore 373. Similarly, passage 377 branches into three passages 377a, 377b, and 377c which connect with the bore 373. The valve block 370 also includes passages 378a, 378b, and 378c which connect with bore 373 and are circumferentially displaced from corresponding passages 376a, 376b, and 376c, and passages 379a, 379b, and 379c which connect with bore 373 and are circumferentially displaced from corresponding passages 377a, 377b, and 377c. The valve pin 374 has a pair of annular grooves 380 and 381 in its outer surface which are spaced apart relative to the branched passages such that the grooves. 380 and 381 are simultaneously alignable with any of the pairs of passages 376a and 377a, 376b and 377b, or 376c and 377c. A hydraulic supply 382 is connected to both passages 379a and 378b. A hydraulic return 383 is connected to both passages 379b and 378a. The damping valve is connected between the passages 378c and 379c.

Thus, when the valve pin 374 is positioned with groove 380 aligned with passages 376b and 378b and groove 381 aligned with 377b and 379b as shown in FIG. 8, fluid is supplied to chamber 362 and returned from chamber 364 to cause extension of the piston 318. No resistive damping takes place during piston extension because damping valve 372 is not in the fluid circuit.

When the valve pin 374 is moved to the left in FIG. 8 to align the grooves 380 and 381 with passages 376a, 378a and passages 377a, 379a, respectively, fluid is supplied to chamber 364 and returned from chamber 362 to cause retraction of the piston 318. Again, no resistive damping takes place during piston retraction.

When the valve pin 374 is moved to the right in FIG. 8 to align the grooves 380 and 381 with passages 376c, 378c and passages 377c, 379c, respectively, all fluid flow between the chambers 362 and 364 goes through the damping valve 372. Piston excursions causing fluid flow between the chambers accordingly are damped by the damping valve 372, which is controlled to achieve a desired degree of damping. To this end, the damping valve 372 includes a power unit 384 for selectively controlling the size of the orifice through damping valve 372. The power units 375 and 384 are controlled by a controller (not shown in FIG. 8) as previously described in connection with FIGS. 2 and 4.

Alternative arrangements of the valving in the valve block 370 may be used. For instance, the damping valve 372 may alteratively be connected between the passage 376 and the passage 377, and passages 376c and 377c may be eliminated. By this arrangement, resistive damping takes place during actuated extension and retraction of the piston 318 when the supply and return channels are open, as well as during reactive piston excursions when the supply and return channels are closed.

The strut 310 when used as an adjunct to the main strut S provides significant advantages during takeoff over known mechanical devices for positioning a bogie beam. For instance, while known devices position the beam to increase landing gear length, most do so only when the gear is not supporting any significant load, and provide no additional damping. In contrast, the invention provides a shock strut which increases the effective length of the landing gear during both landing and takeoff while the gear is supporting substantial loads, and also provides additional damping for the gear. Additionally, the shock strut of the invention damps bogie beam rotation more effectively than known beam positioners or dedicated hop dampers.

Figure 9:
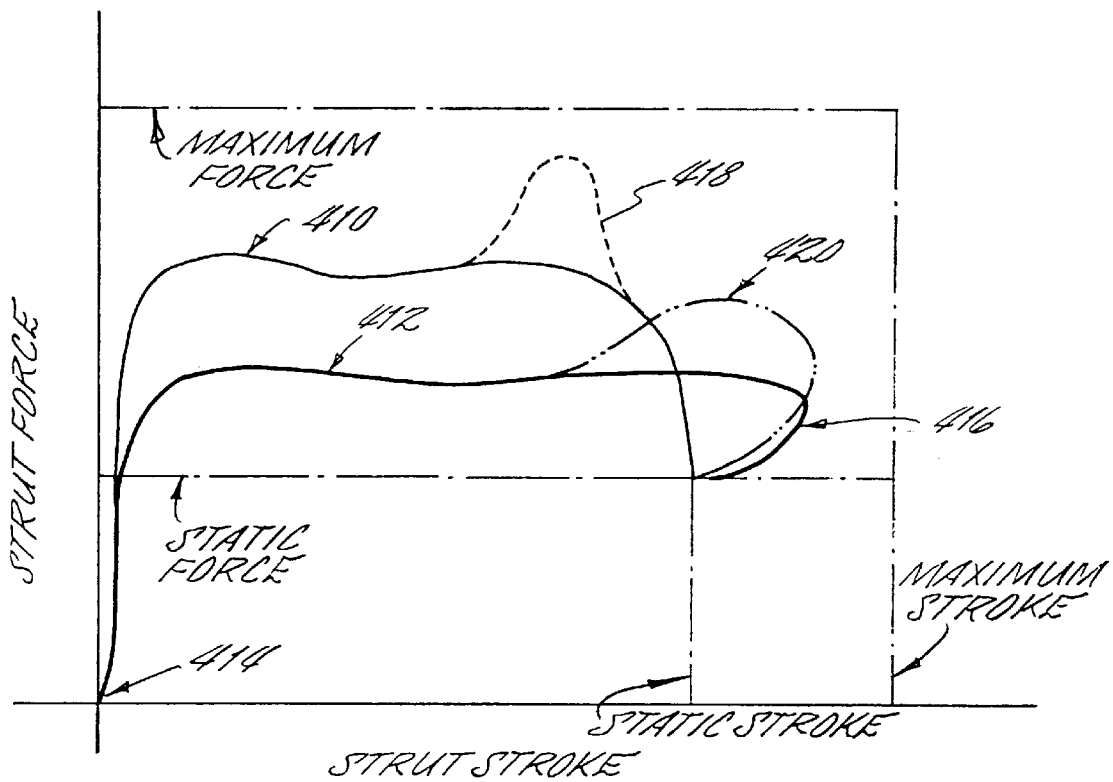
FIG. 9 is a schematic representation of strut load-stroke curves at landing for both a conventional shock strut and a shock strut in accordance with the invention.

The shock strut provided by the invention, whether used as the main shock strut itself as shown in FIG. 1 or as an adjunct thereto as shown in FIG. 7, also affords advantages during landing and taxi of the aircraft, by virtue of its ability to control damping and piston stroke. For example, FIG. 9 depicts load-stroke curves for both a conventional shock strut and a shock strut in accordance with the invention, for an aircraft landing at less than maximum energy. Curve 410 is for a conventional shock strut having a fixed damping rate. Curve 412 is for a shock strut according to the invention. At initial touchdown, indicated at 414, as the load begins to build up at a rapid rate, the controller opens the damping valve to increase the damping orifice size, with the result that maximum load is decreased and piston stroke is increased relative to the conventional strut. As the piston approaches its maximum stroke at 416, the damping valve is moved toward the closed position to decrease the damping orifice size and increase damping rate so as to prevent substantial rebound.

During roll-out of the aircraft after touchdown, if the wheels encounter a bump, a conventional shock strut with a relatively high damping rate is unable to permit the piston to move rapidly enough to accommodate the bump, and therefore the strut transmits a relatively large transient force to the aircraft, as indicated by the force spike at 418. In contrast, with the shock strut of the present invention, the controller senses a sudden piston compression and opens the damping valve to allow a greater piston stroke, as indicated at 420, and thereby reduce the peak force transmitted to the aircraft. Passenger comfort is thus enhanced.

While the invention has been explained by reference to particular embodiments thereof, and while these embodiments have been described in considerable detail, the invention is not limited to the representative apparatus and methods described. Those of ordinary skill in the art will recognize various modifications which may be made to the embodiments described herein without departing from the scope of the invention. Accordingly, the scope of the invention is to be determined by the following claims.

That which is claimed is:

1. A fluid-operated shock absorber system providing active control of damping and force characteristics, comprising:

a shock absorber including a cylinder and a piston received therein, the piston including a ram which is slidable within the cylinder and which divides the space within the shock absorber into first and second chambers which are filled with fluid;

a fluid bypass passage connecting the first and second chambers;

a damping valve disposed within the bypass passage, the valve having a damping valve member that is positionable in any of fully closed and fully open positions and intermediate positions therebetween so as to selectably and variably restrict fluid flow through the bypass passage;

a supply valve coupled to the bypass passage and adapted to be coupled to a fluid supply such that fluid flowing from the fluid supply to the shock absorber passes through the supply valve and into the bypass passage;

a return valve coupled to the bypass passage and adapted to be coupled to a fluid return such that fluid flowing from the shock absorber to the fluid return passes from the bypass passage through the return valve;

a damping valve actuator adapted to move the damping valve member so as to selectively control the amount of flow restriction through the damping valve;

at least one supply actuator adapted to move at least one supply valve member so as to selectively open and close the supply and return valves; and a controller adapted to control the damping and supply actuators so as to selectively control the damping valve and the supply and return valves in response to sensory input received by the controller so as to control the damping, length, and spring characteristics of the shock absorber.

2. The shock absorber system of claim 1 wherein the damping valve and the supply and return valves are housed within a valve block external to the shock absorber, the bypass passage which connects the chambers extending through the valve block.

3. The shock absorber system of claim 2 wherein the supply and return valves are opened and closed by a single supply valve member which is movable within a bore in the valve block, the valve block including first passages connecting the bore to the bypass passage and second passages adapted to connect the bore to the fluid supply and the fluid return.

4. The shock absorber system of claim 2 wherein the supply valve is opened and closed by the supply actuator moving the supply valve member, and further comprising a return valve member and a return valve actuator, the valve block including a first bore in which the supply valve member is movable and a second bore in which the return valve member is movable for opening and closing the supply and return valves.

5. The shock absorber system of claim 1, further comprising a fluid supply coupled to the supply valve, the damping valve and supply valve being connected to the bypass passage such that fluid is supplied from the fluid supply to one of the chambers of the shock absorber when the supply valve is open and the damping valve is closed.

6. The shock absorber system of claim 5, further comprising a fluid return coupled to the return valve, the return valve being connected to the bypass passage such that fluid is returned to the fluid return from the other of the chambers of the shock absorber when the return valve is open and the damping valve is closed.

7. The shock absorber system of claim 6, further comprising a pump connected between the fluid return and the fluid supply for pumping fluid from the fluid return to the fluid supply so as to form a closed fluid circuit.

8. The shock absorber system of claim 1 wherein the damping valve actuator is a servomotor.

9. The shock absorber system of claim 1, wherein the piston includes an internal cavity with a partition supported therein, a gas chamber being defined within the cavity and bounded on one side by the partition, the partition separating the gas chamber from the first and second chambers, the partition being axially movable within the cavity in response to pressure differential across the partition, whereby the gas chamber acts as a gas spring upon compression of the piston into the cylinder.

10. The shock absorber system of claim 1, wherein the first and second chambers have different cross-sectional areas, such that axial movement of the piston with respect to the cylinder results in a differential change in volume between the first and second chambers, whereby the shock absorber acts as a liquid spring when the supply and return valves are substantially closed.

11. A computer-controlled shock absorber system comprising:

a shock absorber including a hollow cylinder having a closed end and an open end and a piston received within the open end, the piston including a ram which is slidable within the cylinder and which divides the space within the strut into first and second chambers which are filled with liquid, the piston ram having an orifice plate defining a primary orifice for flow of liquid between the first and second chambers during piston compression and extension;

a bypass passage connecting the first and second chambers;

a damping valve disposed within the bypass passage, the damping valve including a damping valve member movable by a damping valve actuator which is adapted to be actuated to position the damping valve member in any of fully closed and fully open positions and intermediate positions therebetween so as to selectably and variably restrict liquid flow through the bypass passage; and a microprocessor-based controller adapted to selectively actuate the damping valve actuator in response to sensory input received by the controller so as to control the damping and spring characteristics of the shock absorber by controlling liquid flow through the bypass passage independently of flow through the primary orifice.

12. The shock absorber system of claim 11, wherein the damping valve actuator comprises a motor controlled by the controller and the damping valve and motor are contained within the cylinder.

13. The shock absorber system of claim 12 wherein the motor has a rotatable output shaft which is helically threaded, and the damping valve includes a translating valve member which engages the output shaft such that rotation of the output shaft in one direction or the other causes translation of the valve member to effect closing and opening, respectively, of the damping valve.

14. The shock absorber system of claim 11 wherein the orifice plate has a central hole therethrough, and further comprising a separator tube supported by the cylinder and extending through the central hole of the orifice plate, the primary orifice being defined between an inner edge of the central hole and an outer surface of the separator tube.

15. The shock absorber system of claim 14 wherein the damping valve is disposed within the cylinder and the damping valve member is movable with respect to the separator tube, the separator tube including an opening thereinto, the position of the damping valve member with respect to the opening being controlled by the controller so as to variably restrict liquid flow into the opening.

16. The shock absorber system of claim 11, wherein the piston includes an internal cavity, and further comprising a gas spring disposed within the piston cavity, the gas spring being filled with gas and including a movable diaphragm which separates the liquid from the gas.

17. The shock absorber system of claim 11 wherein the piston is a hollow tube having a closed end outside the cylinder and an open end disposed within the cylinder, the piston telescoping into the cylinder with a first generally cylindrical portion of the piston adjacent the closed end thereof making sealing contact with a first seal mounted within the cylinder adjacent the open end thereof, and wherein the ram comprises an annular ring extending outwardly from the piston and located between the open and closed ends of the piston, the ram making sealing contact with an inner surface of the cylinder, the first portion of the piston having an outer surface of a first diameter and extending between the open end of the piston and the ram, a second portion of the piston having an outer surface of a second diameter smaller than the first diameter, the second portion extending between the ram and the open end of the piston, the cylinder including a second seal which makes sealing contact with the outer surface of the second portion of the piston, the first chamber being bounded by the cylinder and the first portion of the piston between the ram and the first seal and the second chamber being bounded by the cylinder and the second portion of the piston between the ram and the second seal, compression of the piston causing a decrease in the combined volumes of the first and second chambers such that the shock absorber acts as a liquid spring.

* * * * *